No. 637,807. Patented Nov. 28, 1899.
J. MACPHAIL.
HAY RAKE.
(Application filed Nov. 16, 1896.)
(No Model.) 2 Sheets—Sheet 2.
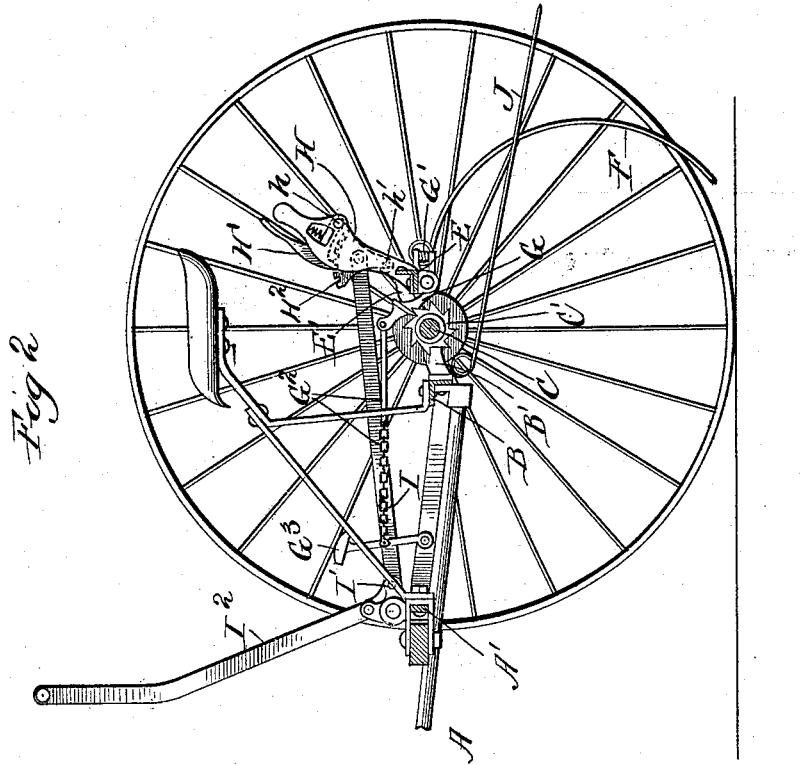
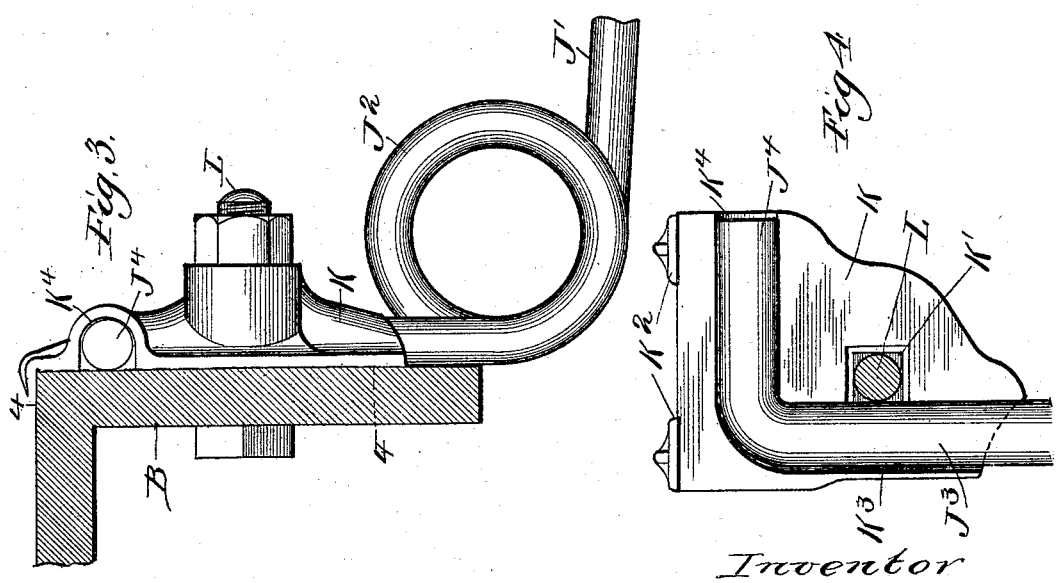
Witnesses
W. C. Coates
C. A. Crawford
Inventor
James Macphail
By Coburn & Strong
Attys

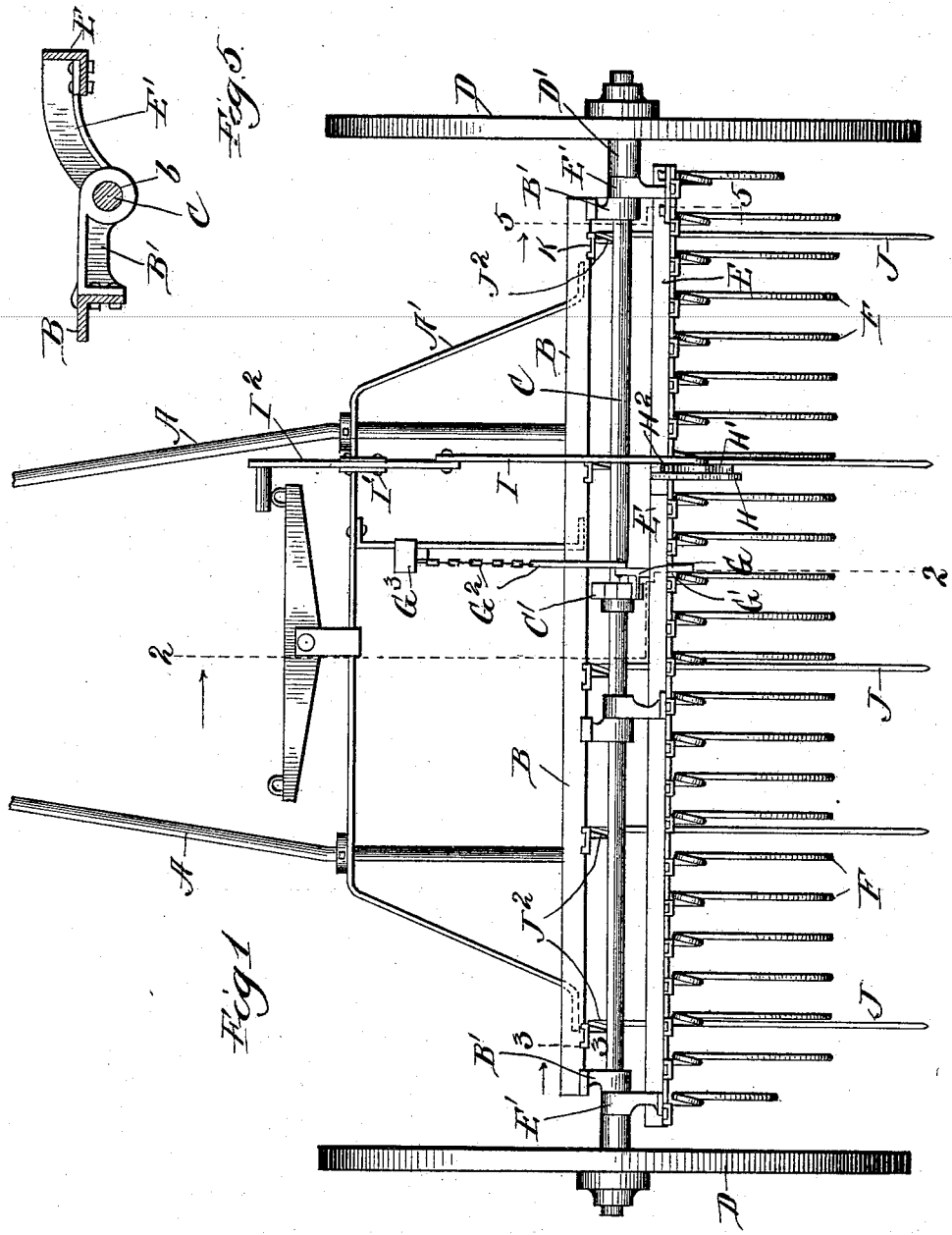

UNITED STATES PATENT OFFICE.

JAMES MACPHAIL, OF BLUE ISLAND, ILLINOIS, ASSIGNOR TO THE PLANO MANUFACTURING COMPANY, OF CHICAGO, ILLINOIS.

HAY-RAKE.

SPECIFICATION forming part of Letters Patent No. 637,807, dated November 28, 1899.

Application filed November 16, 1896. Serial No. 612,251. (No model.)

*To all whom it may concern:*

Be it known that I, JAMES MACPHAIL, a citizen of the United States, residing at Blue Island, in the county of Cook and State of Illinois, have invented a certain new and useful Improvement in Hay-Rakes, which is fully set forth in the following specification, reference being had to the accompanying drawings, in which—

Figure 1 is a plan view showing a hay-rake constructed according to my invention. Fig. 2 is a vertical longitudinal section on the line 2 2 of Fig. 1. Fig. 3 is an enlarged vertical section on the line 3 3 of Fig. 1. Fig. 4 is a rear elevation of the clamping-plate shown in Fig. 3, taken on the line 4 4 thereof. Fig. 5 is a vertical section on the line 5 5 of Fig. 1.

My invention relates to hay-rakes, and has for its object to provide improved mechanism for cleaning or stripping the rake-teeth.

Referring to the drawings by letter, A represents the thills or shafts, A' the main frame-bar, and B a transverse angle-iron bar, all of which parts go to make up the frame of the machine in the usual manner.

To the angle-iron bar B are secured the rearwardly-extending brackets B', provided with bearings $b$, in which is mounted the wheel-shaft C. The said wheel-shaft is provided near its center with the ratchet-wheel C' and at opposite ends with the carrying-wheels D, mounted on sleeves D', keyed to the shaft C.

To the rake-teeth angle-iron bar E are secured two or more forwardly-extending brackets E', which are loosely mounted at their forward ends upon the shaft C. To the upright flange of the angle-iron E are secured the rake-teeth F in any desirable manner. The attachment which I prefer will be illustrated in respect to the strippers. Beneath the said angle-iron E there is pivotally mounted a pawl G, adapted to be normally held out of engagement with the ratchet C' by the expansion-spring G'. To the pawl G is secured a link and chain $G^2$, connecting it with the foot-lever $G^3$. When the foot-lever is depressed, the pawl G is thrown into engagement with the ratchet-wheel C' and the rake is elevated in the usual manner.

Upon the top of the angle-iron E is rigidly mounted a lever H, to which is pivoted, as at $h$, a spring-controlled dog H', adapted to engage with the teeth of the segmental rack $H^2$, also pivoted to the lever H, as at $h'$. A connecting-rod I is pivotally secured to the rack-segment $H^2$ and the short arm I' of the hand-lever $I^2$. The hand-lever is adapted to hold the rake in its raised position when it has been elevated by the ratchet C' and the pawl G. An adjustment of the dog H' on the rack $H^2$ will control the position of the rake-teeth in their normal lower position.

Referring now more particularly to the strippers, I show five strippers J, each consisting of a straight rod of elastic metal J', bent at its inner end into one or more spirals $J^2$, provided with a short upright branch $J^3$, and terminating in a horizontal branch $J^4$. To secure the stripper to the angle-iron B, I clamp a clamping-piece K, provided with the bolt-hole K', with lugs $K^2$, adapted to project over the upper edge of the angle-iron, and with the channels $K^3$ and $K^4$, adapted to receive the branches $J^3$ and $J^4$, respectively, of the stripper J. A bolt L secures the clamping-piece K to the angle-iron B, and thus firmly holds in place the stripper J.

It will be obvious that the strippers may be attached in other ways, and I do not, therefore, limit myself to the specific devices shown and described; but

What I claim, and desire to secure by Letters Patent, is—

In a horse hay-rake, the main frame-bar B located in front of the axle, the strippers J of elastic metal comprising substantially the horizontal main portion J', the spire $J^2$, the vertical portion $J^3$ and the horizontal portion $J^4$ arranged as described; and the clamping-piece K provided with the vertical channel-pieces $K^3$ and the horizontal channel-pieces $K^4$ adapted to clamp the said strippers to the said frame-bar, substantially as described.

JAMES MACPHAIL.

Witnesses:
A. A. MURRAY,
FLORA BROM.